(12) United States Patent
Belik

(10) Patent No.: US 9,261,232 B2
(45) Date of Patent: Feb. 16, 2016

(54) CENTRIFUGAL APPLICATOR

(71) Applicant: NATIONAL OILWELL VARCO, L.P., Houston, TX (US)

(72) Inventor: Jaroslav Belik, Smithville, TX (US)

(73) Assignee: National Oilwell Varco, L.P., Houston, TX (US)

( * ) Notice: Subject to any disclaimer, the term of this patent is extended or adjusted under 35 U.S.C. 154(b) by 306 days.

(21) Appl. No.: 13/866,862

(22) Filed: Apr. 19, 2013

(65) Prior Publication Data

US 2013/0277150 A1  Oct. 24, 2013

Related U.S. Application Data

(60) Provisional application No. 61/636,096, filed on Apr. 20, 2012.

(51) Int. Cl.

| *F16N 13/00* | (2006.01) |
|---|---|
| *F16N 13/16* | (2006.01) |
| *B05B 3/10* | (2006.01) |
| *B05B 13/06* | (2006.01) |
| *F16L 15/00* | (2006.01) |
| *B05B 1/14* | (2006.01) |

(52) U.S. Cl.
CPC .............. *F16N 13/00* (2013.01); *B05B 3/1021* (2013.01); *B05B 13/0636* (2013.01); *F16L 15/001* (2013.01); *F16N 13/16* (2013.01); *B05B 1/14* (2013.01)

(58) Field of Classification Search
CPC .... B05B 13/0636; B05B 1/14; B05B 3/1021; F16L 15/001; F16N 13/10; F16N 13/16
USPC ........................................................... 184/26
See application file for complete search history.

(56) References Cited

U.S. PATENT DOCUMENTS

| 3,044,441 | A | * | 7/1962 | Blakeslee et al. | ............. | 118/317 |
|---|---|---|---|---|---|---|
| 3,081,947 | A | * | 3/1963 | Walter | ............ | 239/246 |
| 3,252,442 | A | * | 5/1966 | Hazlett | ............. | 118/685 |
| 3,279,427 | A | * | 10/1966 | Clancy et al. | ................ | 118/317 |
| 3,516,385 | A | * | 6/1970 | Walling | ............. | 118/710 |
| 4,199,858 | A | | 4/1980 | Meijs | | |
| 5,404,965 | A | | 4/1995 | McCormick | | |
| 5,752,657 | A | * | 5/1998 | Hogan et al. | ................ | 239/7 |
| 7,963,371 | B2 | * | 6/2011 | Belik | ............... | 184/6 |
| 2004/0140159 | A1 | * | 7/2004 | Belik | .............. | 184/14 |
| 2004/0188538 | A1 | * | 9/2004 | Birdsall | .............. | 239/214 |
| 2009/0272603 | A1 | | 11/2009 | Belik | | |
| 2010/0213277 | A1 | | 8/2010 | Bowen | | |

FOREIGN PATENT DOCUMENTS

JP  58-219965 A  12/1983

OTHER PUBLICATIONS

The International Search Report and Written Opinion of the International Searching Authority, dated Jul. 25, 2013, for International Application No. PCT/US2013/037458.

\* cited by examiner

*Primary Examiner* — Michael Mansen
*Assistant Examiner* — Robert T Reese
(74) *Attorney, Agent, or Firm* — Conley Rose, P.C.

(57) ABSTRACT

A pipe lubricant applicator includes a rotatable housing to receive a lubricant, the housing having a central axis and a concave inner surface and wherein an axis extending radially from the central axis of the housing intersects the concave inner surface at an angle that is not 90°.

13 Claims, 8 Drawing Sheets

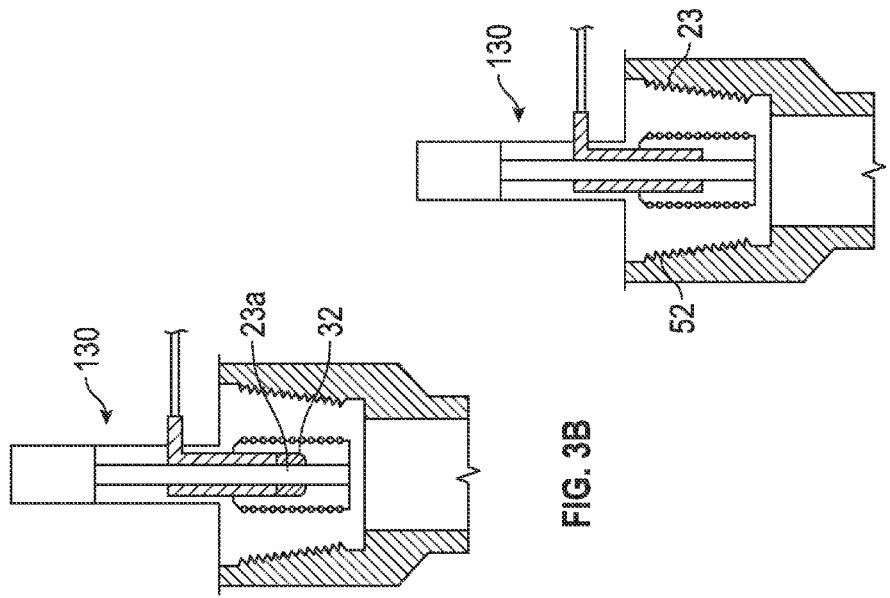
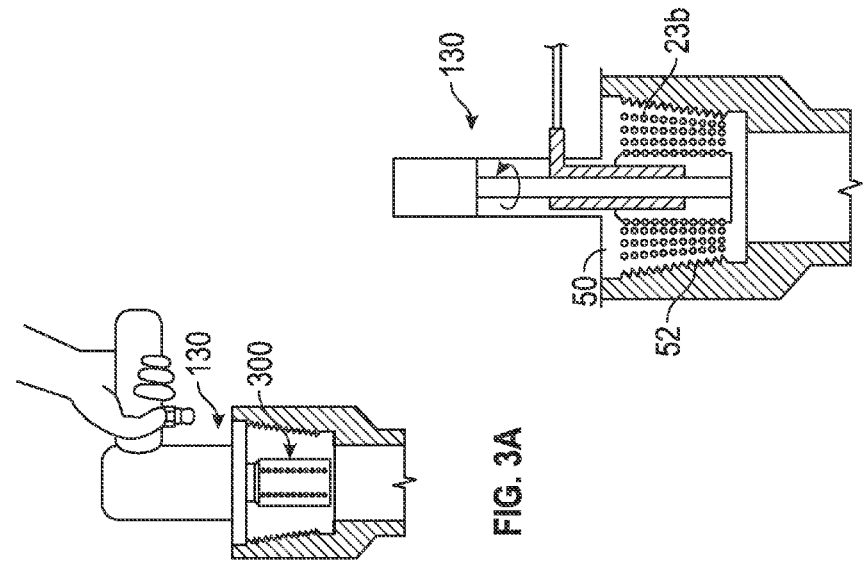

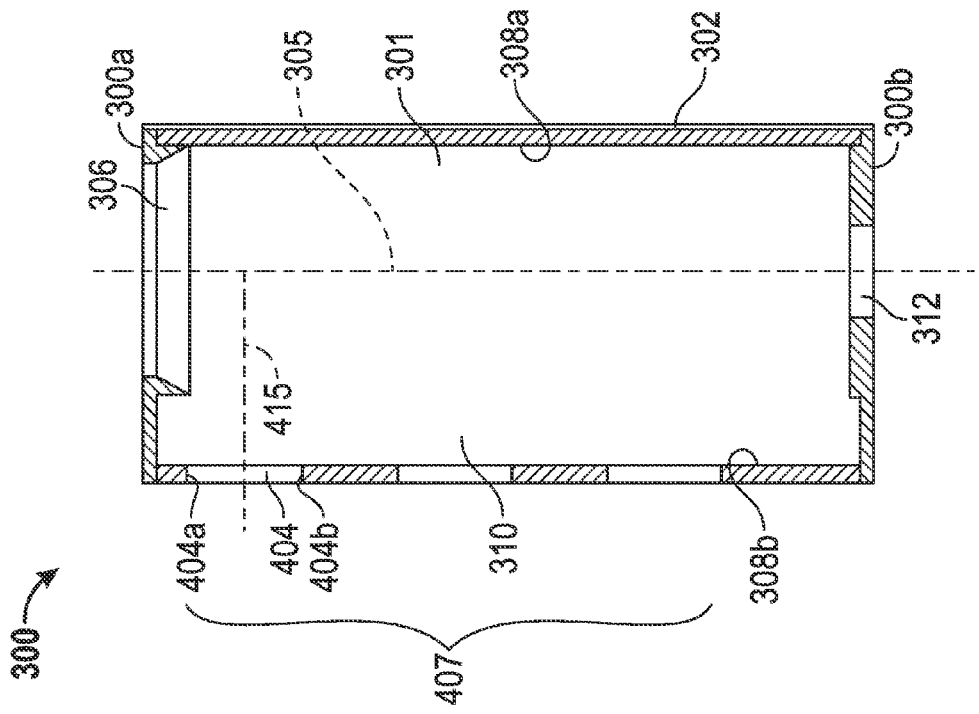
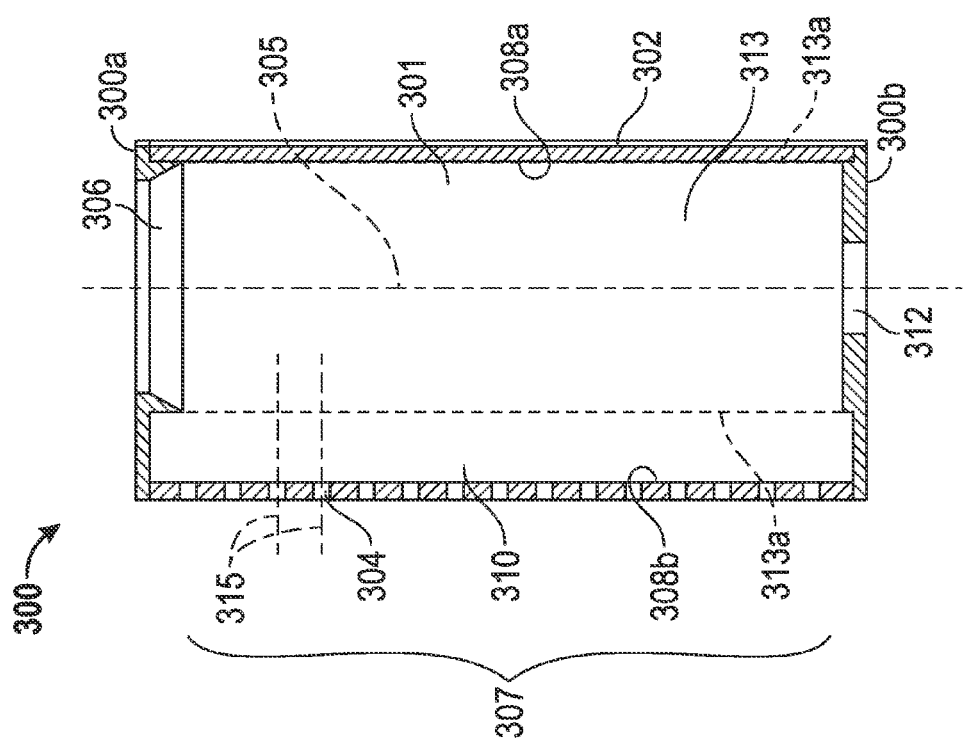

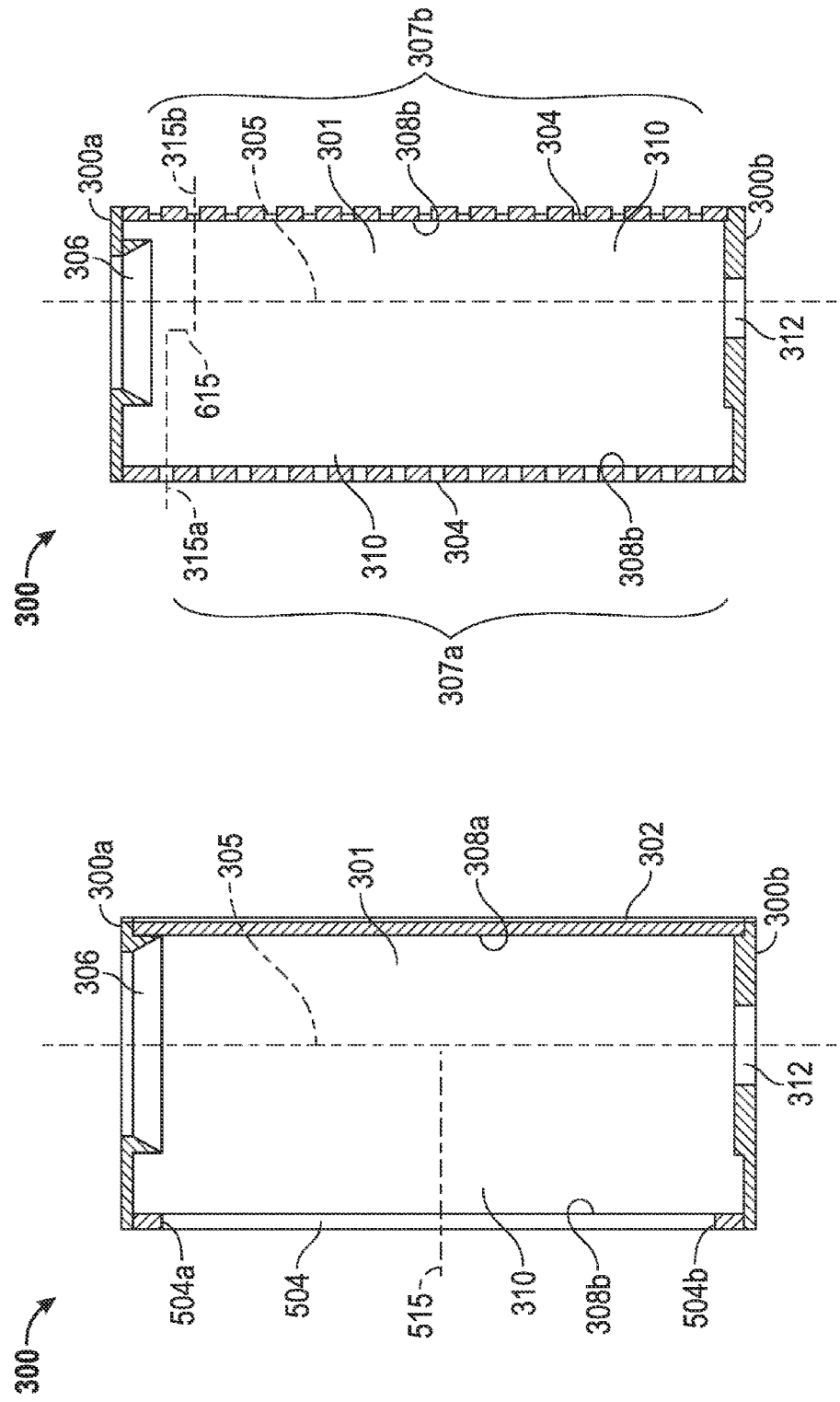

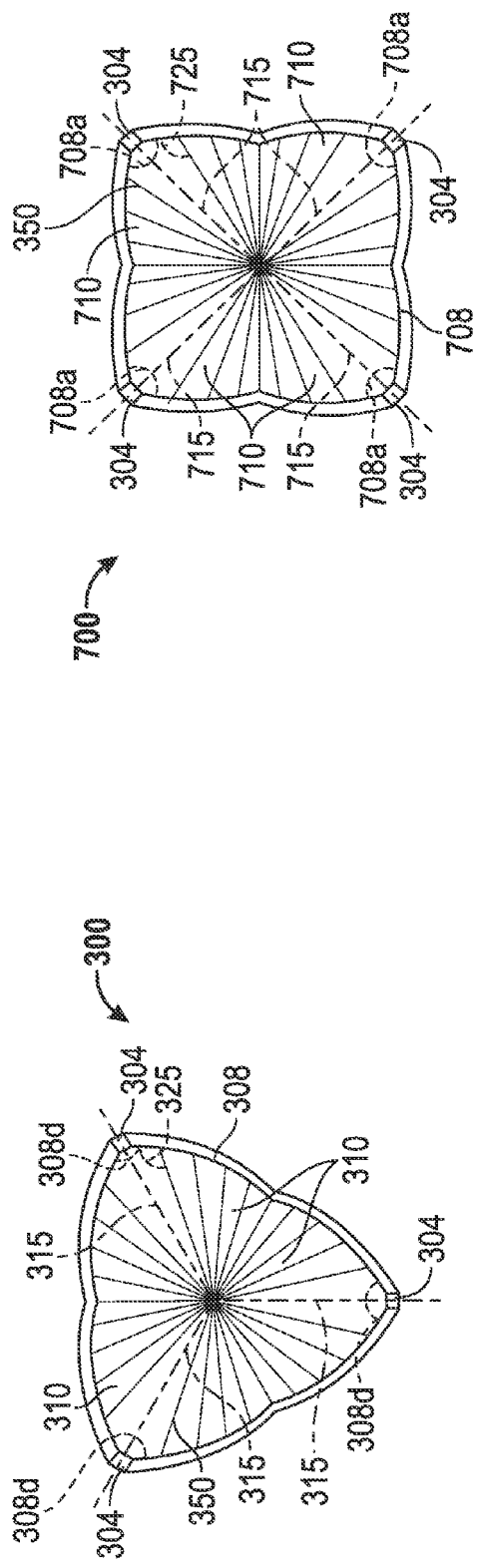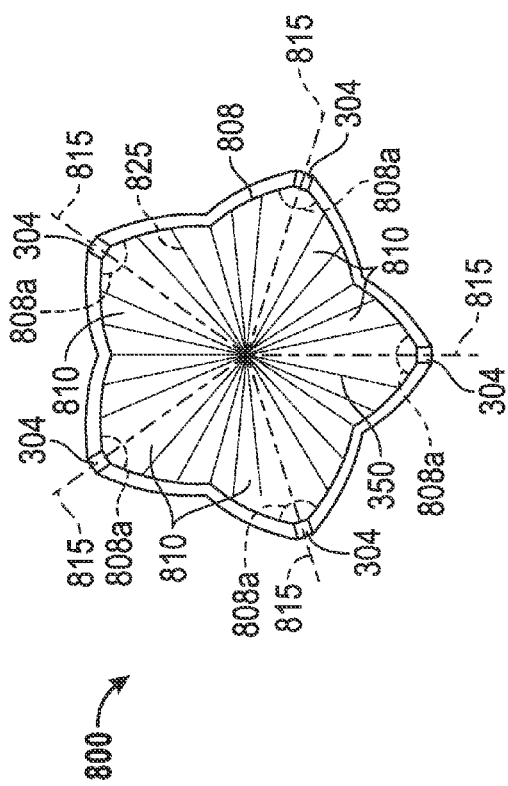

CENTRIFUGAL APPLICATOR

CROSS-REFERENCE TO RELATED APPLICATIONS

The present application is a non-provisional application claiming priority to U.S. Provisional Patent Application Ser. No. 61/636,096, filed on Apr. 20, 2012, entitled "Centrifugal Applicator."

STATEMENT REGARDING FEDERALLY SPONSORED RESEARCH OR DEVELOPMENT

Not applicable.

BACKGROUND

The disclosure relates to threaded pipe connections and the like. More particularly, the disclosure relates to applying a lubricating material, such as pipe dope or lubricant, to the internal threads of a pipe.

In the oil and gas production industry, threaded pipe connections are often used. Special types of lubricant compositions are used for application between the male and female parts of these threaded tubular connections. The use of a pipe thread dope (i.e., lubricant), or "pipe dope" as it has been called, may be required to provide a more stable joint. Pipe dope is a paste-like material that is applied to clean internal pipe threads just prior to joint assembly and provides three basic benefits to a threaded pipe joint. First, it lubricates the threads which eases assembly and helps to prevent seizing and galling. Second, it acts as a sealant that enhances the gas-tightness or fluid-tightness of the resulting joint. And third, it prevents corrosion in drill pipe threads which aids in separation and reuse of drill pipe.

Certain methods do not assure a uniform application of the dope, either over the threads of one fitting or from joint to joint. Also, the amount of dope used is not regulated or controlled, so too much or too little dope may be used. Each of these situations may compromise the quality, durability, and reliability of the resulting threaded pipe joint. For example, too little pipe dope on the threads may result in increased friction in the threads during spinning, which may cause galling of the threaded surface. Conversely, too much pipe dope on the threads may result in pollution of the system (e.g. excess pipe dope may fall into the drillstring).

The quality of a threaded pipe joint is highly dependent upon the skill or craftsmanship of the user in applying the pipe dope. Thus, an apparatus to provide a uniform application of an appropriate quantity of pipe dope will greatly benefit the quality of threaded pipe joints. Further, it is advantageous to provide high centrifugal forces to the pipe dope to ensure uniform application and reduce application time. Further, it is advantageous to provide a centrifugal applicator configured for applying pipe dope at cold temperatures.

BRIEF SUMMARY OF THE DISCLOSURE

In an embodiment, a pipe lubricant applicator comprises a rotatable housing to receive a lubricant, the housing having a central axis and a concave inner surface and wherein an axis extending radially from the central axis of the housing intersects the concave inner surface at an angle that is not 90°. In some embodiments, substantially all of the axes extending radially from the central axis of the housing intersect the concave inner surface at angles that are not 90°.

In another embodiment, a pipe lubricant applicator comprises an applicator housing to receive a pipe lubricant, the housing including a central axis, an inner surface, and an outer surface and an opening in the housing through the inner and outer surfaces to receive the pipe lubricant. In this embodiment the inner surface comprises a plurality of concave surfaces and an axis extends radially from the central axis intersects any one of the plurality of concave inner surfaces at an obtuse angle. In some embodiments, substantially all of the axes extending radially from the central axis intersect one of the concave inner surfaces at an obtuse angle.

In another embodiment, a method for applying a coating of lubricant on pipe threads comprises rotating a housing, supplying the lubricant to an interior volume of the housing and forcing the lubricant toward a concave inner surface of the housing such that substantially all of the lubricant contacts the concave inner surface along a vector including an obtuse angle with the concave inner surface whereby the lubricant is funneled in the direction of the obtuse angle toward an opening in the housing.

BRIEF DESCRIPTION OF THE DRAWINGS

For a detailed description of the preferred embodiments of the disclosure, reference will now be made to the accompanying drawings in which:

FIGS. 3A-3D are partial sectional schematics of FIG. 1 illustrating the process of applying lubrication;

FIGS. 6A-6D are cross-sectional views of various embodiments of the housing of FIG. 3; and FIG. 7A-7C are cross-sectional views of other embodiments of housings that may be used in the centrifugal applicator of FIGS. 1 and 2.

DETAILED DESCRIPTION

Figure 1:
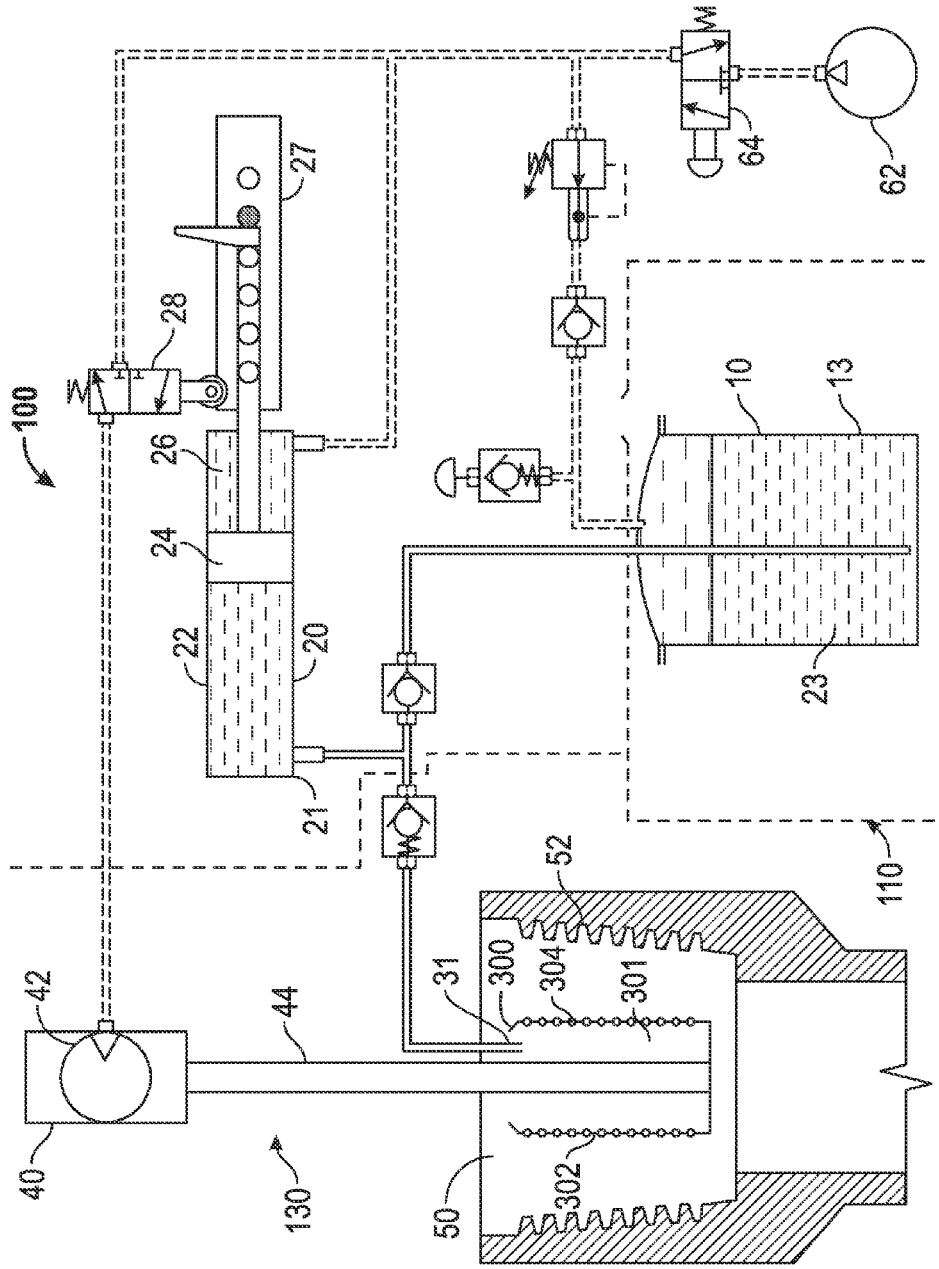
FIG. 1 is a schematic of one embodiment of a lubrication assembly.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness. It is to be fully recognized that the different teachings of the embodiments discussed below may be employed separately or in any suitable combination to produce desired results.

Unless otherwise specified, any use of any form of the terms "connect", "engage", "couple", "attach", or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". The phrase "internal threads" refers to the female threads cut into the end of a length of pipe. The terms "lubricant," "pipe thread dope," "pipe dope," and "thread compound" are interchangeable and describe a material that is capable of sealing and/or lubricating a pipe joint. In addition, reference to the terms "left" and "right" are made for purposes of ease of description. The terms "pipe," "tubular member," "casing" and the like as used herein shall include tubing and other generally cylindrical objects. In addition, in the discussion and claims that follow, it may be sometimes stated that certain components or elements are in fluid communication. By this it is meant that the components are constructed and interrelated such that a fluid could be communicated between them, as via a passageway, tube, or conduit. The various characteristics mentioned above, as well as other features and characteristics described in more detail below, will be readily apparent to those skilled in the art upon reading the following detailed description of the embodiments, and by referring to the accompanying drawings.

Referring to FIG. 1, an embodiment of a lubrication assembly 100 is shown. Upon activation of assembly 100, a centrifugal applicator 130 takes the predetermined amount of lubricant from a supply 110 and distributes the lubricant on internal threads 52. Lubrication assembly 100 may be configured for handheld use by a single operator or may preferably be integrated into an automated pipe handling or iron roughneck system so that the threaded connections are automatically lubricated. The preferred assembly may be powered by any convenient power source, such as pneumatic, hydraulic, and electrical power.

Referring initially to FIGS. 1 and 3A, lubrication assembly 100 preferably includes a pipe dope container 10, a dosing device 20, applicator 130 including a housing or centrifugal drum 300, and a motor 40. Pipe dope container 10 is partially filled with a pipe dope 23. Dosing device 20 preferably includes a nozzle 21, a pipe dope side 22, a piston 24, a gas part 26, a cam 27 and a cam valve 28. The high pressure gas circuit includes a gas supply 62, a trigger valve 64, dosing device 20 and a motor 40. Gas supply 62 is preferably connected to trigger valve 64, which is preferably connected to gas side 26 of dosing device 20. Gas side 26 is preferably connected to cam valve 28 through cam 27 and cam valve 28 is preferably connected to air motor 42.

In order for lubrication to begin, an operator pushes trigger valve 64 and holds trigger valve 64 for a desired amount of time. This maneuver causes gas pressure to flow into gas side 26 of dosing device 20. Piston 24 creates high pressure in pipe dope side 22 of dosing device 20, forcing pipe dope 23 in pipe dope side 22 out of dosing device 20 through nozzle 21 to housing nozzle 31, which directs pipe dope 23 into collection area 301 of housing 300. As shown in FIGS. 1 and 3B, a pool 23a of pipe dope 23 is formed in collection area 301. At this time, piston 24 moves to the left, moving cam valve 28 to its open position. With cam valve 28 open, high pressure gas is allowed to flow to air motor 42, causing a shaft 44 and housing 300 to rotate, discharging pipe dope 23 through the plurality of openings 304 via centrifugal force, as will be disclosed further herein. FIG. 3C shows droplets 23b of pipe dope 23 suspended in an opening 50, which will deposit onto the surface of female pipe threads 52.

Referring now to FIGS. 1 and 3D, lubrication assembly 100 is shown when lubrication is complete. As shown on FIG. 3D, pipe dope 23 has thoroughly coated the surface of female pipe threads 52. The operator has released trigger valve 64 at this point. Because the gas supply is disconnected, air motor 42 subsequently stops rotating. Low gas pressure pushes pipe dope 23 from pipe dope part 13 to pipe dope side 22 of dosing device 20. The pipe dope 23 flowing into pipe dope side 22 pushes piston 24 to the right. During this time, cam 27 preferably releases cam valve 28 to its closed position. More information on this embodiment of lubrication system 100 is disclosed within U.S. Pat. No. 7,963,371, which is incorporated in its entirety herein by reference.

Figure 2:
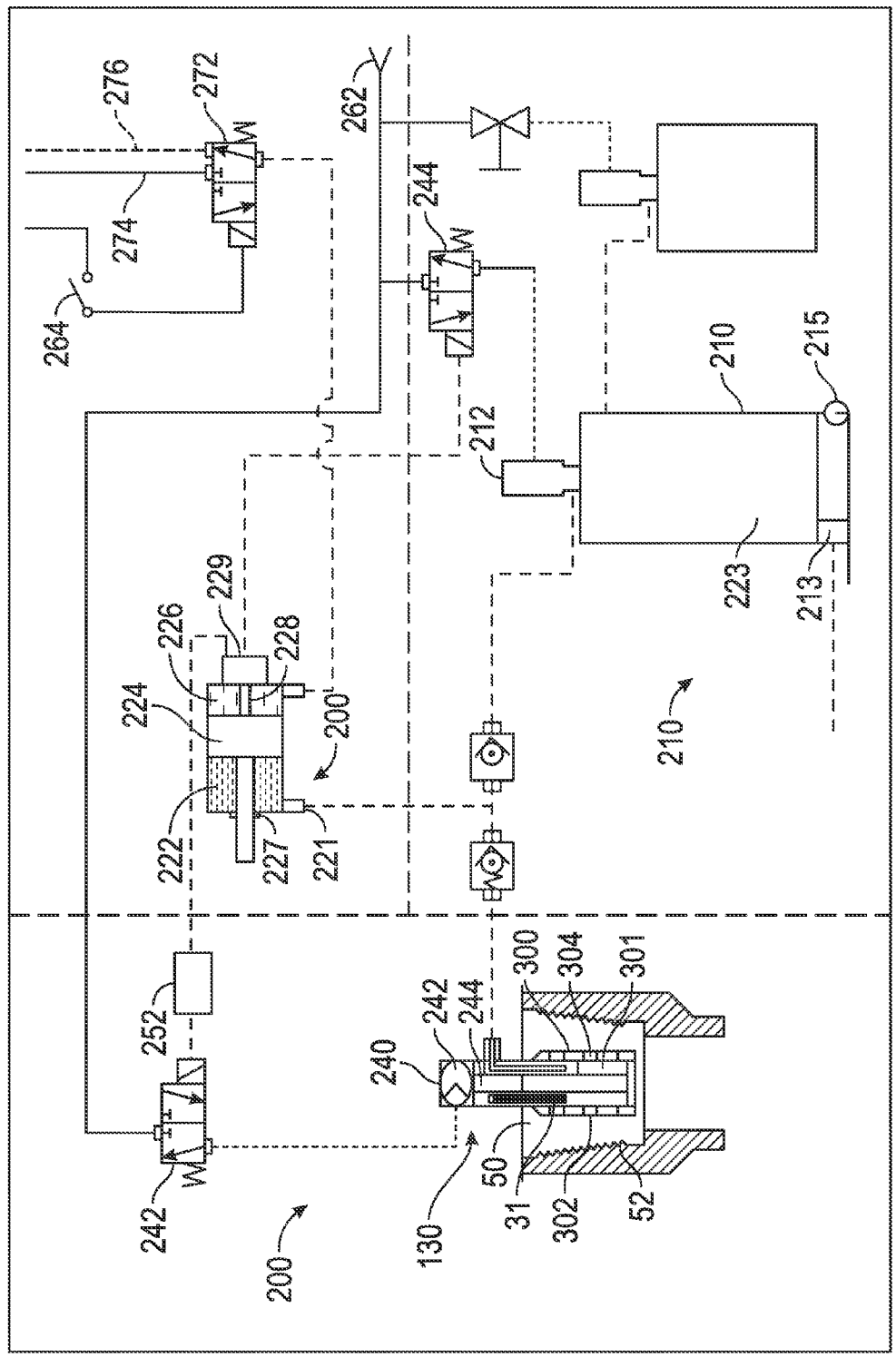
FIG. 2 is a schematic of another embodiment of a lubrication assembly.

Referring to FIGS. 2 and 3A an alternative embodiment, lubrication assembly 200, is shown. Lubrication assembly 200 is shown at a first time point prior to lubrication. Lubrication assembly 200 includes a pipe dope container 210, a dosing device 220, housing 300, and a motor 240. Pipe dope container 210 includes a grease pump 212 and is filled with a pipe dope 223.

Dosing device 220 includes a port 221, a pipe dope side 222, a piston 224, and a hydraulic side 226. As shown in FIG. 2, piston 224 is in an extended position. Motor 240 is a pneumatic motor 242, such as are known in the art and are used for high-speed rotating hand tools such as grinders. Pneumatic motor 242 includes a rotor (not shown) connected to a shaft 244. Shaft 244 is connected to housing 300.

Grease pump valve 244 is connected to a dose adjust controller 229, which is in turn connected to position sensor 228 and a timer 252. Timer 252 is also connected to motor valve 242. Dose adjust 229 is connected to a start switch 264, which is connected to a hydraulic valve 272.

Pipe dope container 210 is connected through grease pump 212 to a port 221 located on the pipe dope side 222 of dosing device 220 and a housing nozzle 231. In another embodiment, pipe dope container 210 is also connected to a fill sensor 213 and a pivot 215. Hydraulic valve 272 is connected to a hydraulic supply 274 and a hydraulic return 276. Hydraulic valve 272 is also connected to hydraulic side 226 of dosing device 220.

Referring now to FIGS. 2 and 3B, lubrication assembly 200 is shown at the beginning of lubrication. In order for lubrication to begin, an operator engages start switch 264, which causes hydraulic valve 272 to open allowing hydraulic fluid from hydraulic supply 274 to flow into hydraulic side 226 of dosing device 220. The pressure of the hydraulic fluid in the hydraulic side of device 220 forces piston 224 toward the pipe dope side 222 of dosing device 220. Thereby, piston 224 creates high pressure in pipe dope side 222 of dosing device 220, which allows piston 224 to force pipe dope 223 in pipe dope side 222 out of dosing device 220 through port 221, moving piston 224 to the left. Piston 224 forces all of pipe dope 223 out of dosing device 220. Pipe dope 223 passes to a housing nozzle 231, which directs pipe dope 223 into collection area 301 of housing 300.

Referring now to FIGS. 2 and 3C, lubrication assembly 200 is shown during application of the lubricant. The operator has released start switch 264 allowing hydraulic valve 272 to connect hydraulic side 226 to hydraulic return 276. Simultaneously, dose adjust controller 229 signals timer 252 to open motor valve 242 for a preset amount of time allowing high pressure gas from gas supply 262 to flow to pneumatic motor 242 within motor 240, which causes shaft 244 to rotate at a high rotational rate. At the same time, dose adjust controller 229 opens grease pump valve 244 allowing high pressure gas from gas supply 262 to actuate grease pump 22. When shaft 244 rotates, housing 300 rotates and pipe dope 223 is discharged through the plurality of openings 304 via centrifugal force.

Referring now to FIGS. 2 and 3D, lubrication assembly 200 is shown when lubrication is complete. Timer 252 has closed motor valve 242 causing centrifugal applicator 230 to stop rotation. As indicated above, high pressure gas from gas supply 262 now flows through grease pump valve 244 to grease pump 212. Grease pump 212 pumps pipe dope 223 from pipe dope container 210. Pipe dope 223 then passes through port 221 and into pipe dope side 222 of dosing device 220 and moving piston 224. As detailed above, hydraulic fluid is displaced from hydraulic side 226 of dosing device 220 as pipe dope 223 forces piston 224 to displace to the right, completing the cycle of system 200. In an embodiment, when pipe dope container 210 begins to run low on pipe dope 223, fill sensor 213 will give an indication to the operator to add pipe dope 223 to pipe dope container 210 using pivot 215.

While the lubrication assembly of the present invention has been described in terms of a manually operated device, in an embodiment, the lubrication assembly may be machine operated, e.g., by a robotic arm. For example, a lubrication assembly could be integrated into an automatic pipe handling or pipe racking system so that the pipe joints are automatically lubricated as they are being moved into position on the drill floor. Similarly, a lubrication assembly could be integrated into a top drive system so that the pipe joint can be lubricated as pipe is being run into the hole. Systems such as these could eliminate the need for personnel either on the drill floor or the monkey board applying lubricant to pipe joints during operations. More information on this embodiment of lubrication system 200 is disclosed within U.S. Pat. No. 7,963,371, which is incorporated in its entirety herein by reference.

Figure 4:
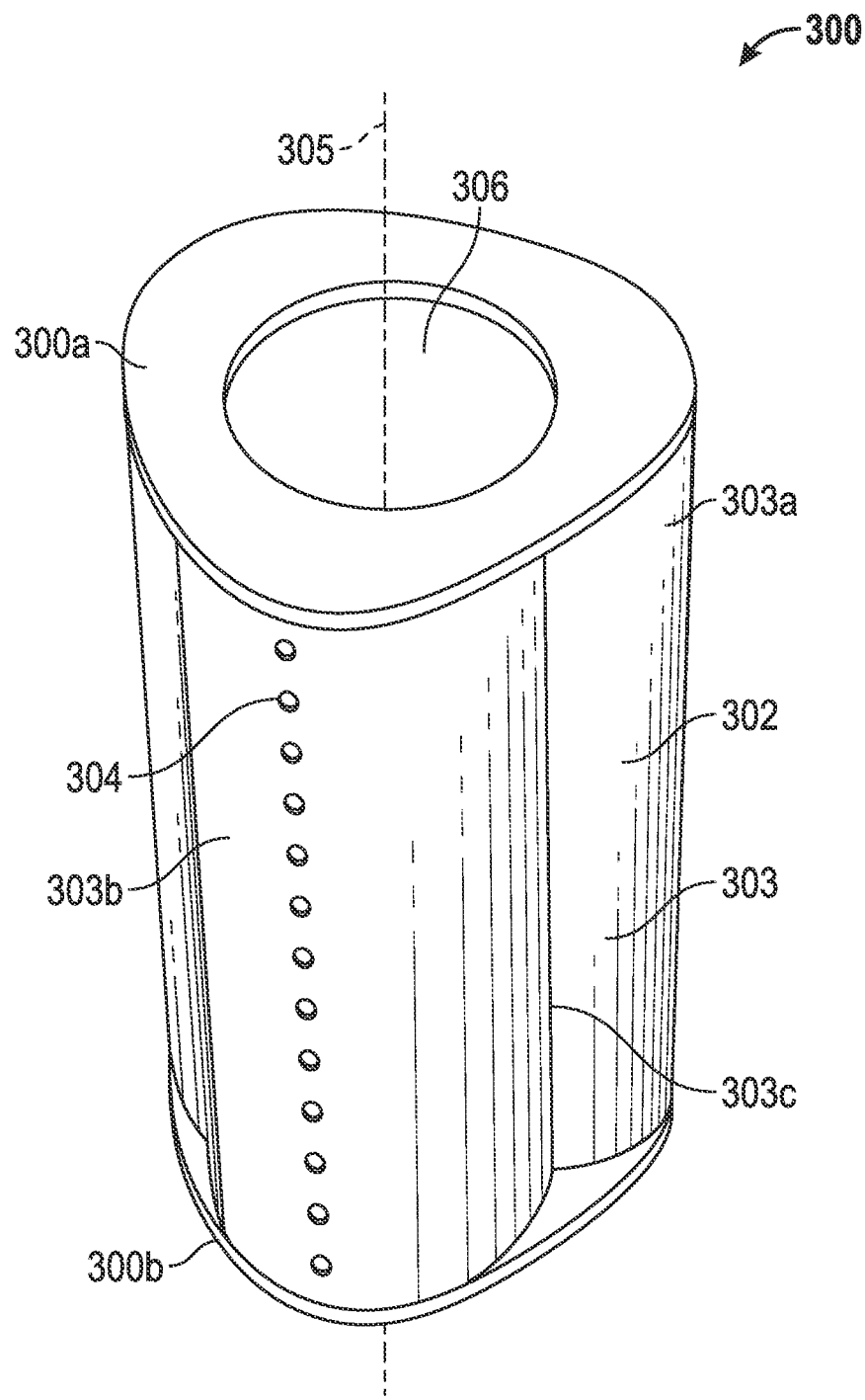
FIG. 4 is a perspective view of an embodiment of the housing of the centrifugal applicator shown in FIGS. 1 and 2.

Referring to FIG. 4, an embodiment of housing 300 is shown. Housing 300 has a first end 300a, second end 300b, an intermediate body portion 302 extending between the ends 300a, 300b, and a central or longitudinal axis 305. The body 302 includes a convex outer surface 303 and extending therethrough are a plurality of openings 304. In some embodiments, the outer surface 303 is divided or separated into sections 303a, 303b. The sections 303a, 303b are separated by lines, indentations, or grooves 303c. In this embodiment, openings 304 have a circular shape, are aligned with longitudinal axis 305 of housing 300 and extend from proximal to the first end 300a to proximal to the second end 300b of housing 300. Housing 300 also has an inlet 306 disposed at first end 300a and aligned with central axis 305, which allows for fluid communication between the interior of housing 300 and a volume exterior of housing 300.

Figure 5B:
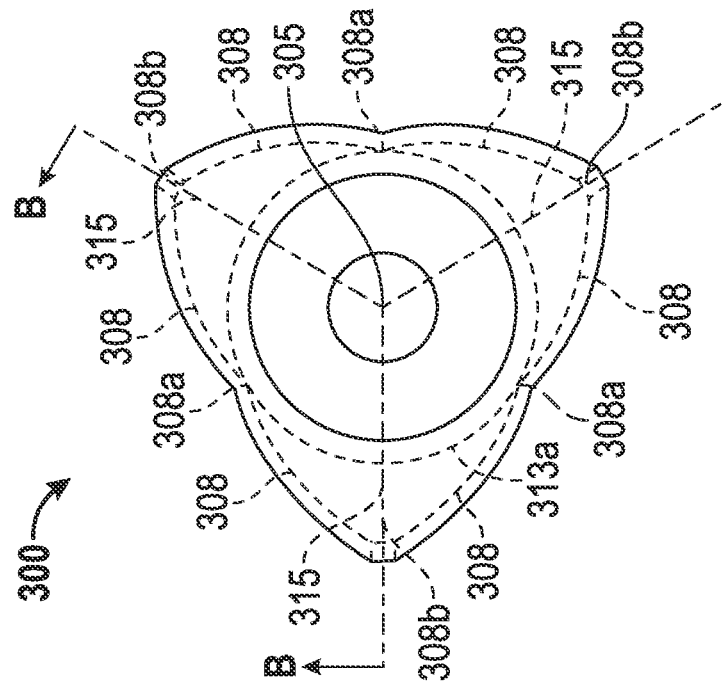
FIGS. 5A, 5B are top views of the housing of FIG. 3.
Figure 5A:
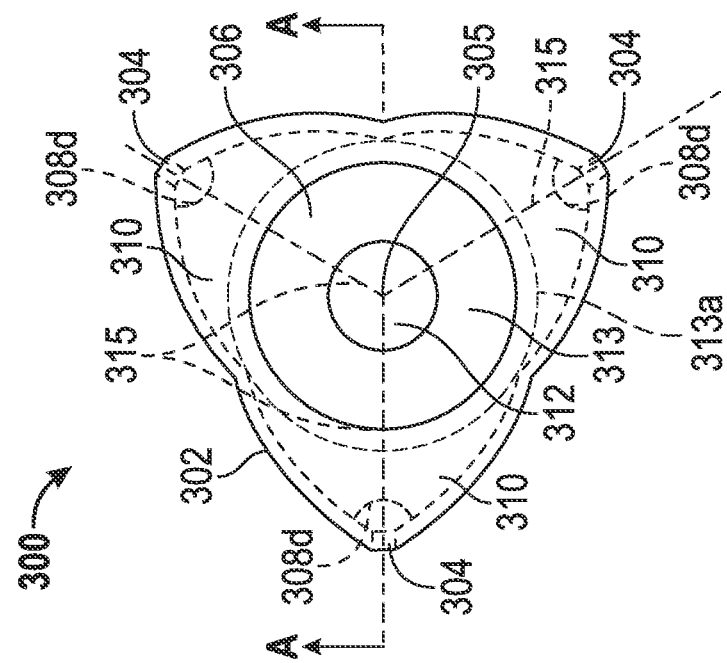

Referring to FIGS. 5A and 5B, top views of an embodiment of centrifugal housing 300 are shown. In this embodiment, housing 300 has a circular cross-sectional portion 313 aligned with central axis 305 and defined by an edge 313a and three elongated or funnel sections 310 (FIG. 5A) extending from circular cross-sectional portion 313 to a concave inner surfaces 308 (FIG. 5B). Each elongated section 310 includes a central axis 315 that radially extends between axis 305 and openings 304. Concave inner surfaces 308 intersect at first ends 308a, which are positioned at the edge 313a of circular cross-sectional portion 313, and at second ends 308b, which are positioned proximal to opening 304. Thus, each elongated section 310 is defined by three sides: edge 313a of circular cross-sectional portion 313 that intersect two inner surfaces 308 at first ends 308a, with concave inner surfaces 308 intersecting at second end 308b.

Openings 304 are disposed coaxially with central or longitudinal axis 315 of sections 310. In this embodiment, housing 300 also includes a bottom opening 312, as will be discussed further herein. In this arrangement, the pair of concave inner surfaces 308 of each elongated section 310 are disposed in an opposed relationship where one concave surface 308 of the section 310 faces the other surface 308. In other words, each concave surface 308 is defined by a curved, concave plane and the opposed concave planes that define opposed concave surfaces 308 of each section 310 intersect at an angle 308d (FIG. 5A) that is less than 180° (i.e., surfaces 308 are disposed at angle 308d relative each other). As will be discussed further herein, the opposed relationship of inner surfaces 308 of each section 310 is configured to direct or "funnel" fluid displaced radially outward from axis 305 to inner surfaces 308 towards openings 304.

Referring to FIG. 6A, a cross-sectional view along section A-A (shown in FIG. 5A) of the embodiment of centrifugal housing 300 shown in FIG. 4 is shown. As discussed earlier, in this embodiment, housing 300 includes a bottom opening 312, which is disposed at second end 300b and is aligned with central axis 305. Circular cross-sectional area 313 extends to first end 300a, along central axis 305, to second end 300b of housing 300. As shown in cross-section A-A, elongated section 310 is partially defined by edge 313a of circular cross-sectional portion 313 and second end 308b of inner surface 308. Further, it is also shown that first end 308a of inner surface 308 is disposed at edge 313a defining circular cross-sectional area 313. In this embodiment, openings 304 are shown, each having a central axis 315 that is perpendicular to and intersects central axis 305 of housing 300. Openings 304 are placed in a pattern which depends upon the desired distribution of pipe dope within the pipe with larger and more numerous openings allowing more lubricant to flow through the housing and onto the corresponding pipe threads. For example, placement of larger and/or more holes at the top of the housing permits a greater quantity of lubricant to flow through the housing and onto the top, or leading, threads. Openings 304 and those consistent with the teachings herein may also be referred to as a means for distributing pipe dope through housing 300. In an embodiment, the openings 304 are substantially equidistant apart from each other and are arranged in rows 307, with each elongated section 310 having one row 307 disposed along second end 308b. In an embodiment, housing 300 has at least three rows 307 of fifteen openings 304, though other embodiments are contemplated with more or less rows and openings. In some embodiment, openings 304 are 0.07 inches in diameter and are spaced 0.3 inches apart. Other embodiments include different diameters and spacing as desired for lubricant flow. During lubrication, housing 300 is located in opening 50 by centrifugal applicator 130, surrounded by female pipe threads 52.

Referring to FIG. 6B, another embodiment of housing 300 is shown in cross-section A-A. In this embodiment, openings 404 of housing 300 comprise a plurality of elongated slots, each having an upper end 404a and a lower end 404b. A central or longitudinal axis 415 extends through the midpoint of each slot 404 and intersects central axis 305 of housing 300. Slots 404 are arranged in rows 407, with each row 407 having three slots 404 spaced equidistantly apart from each other, with each elongated section 310 of housing 300 having one row 407 disposed along each second end 308b. In an alternative embodiment, rows 407 may contain a different number of slots 404.

Referring to FIG. 6C, another embodiment of housing 300 is shown in cross-section A-A. In this embodiment, openings 504 of housing 300 comprise an elongate slot, each having an upper end 504a disposed proximal to first end 300a of housing 300 and a lower end 504b disposed proximal to second end 300b of housing 300. A central or longitudinal axis 515 extends through the midpoint of each slot 504 and intersects central axis 305 of housing 300. Each elongated section 310 of housing 300 includes one elongate slot 504 disposed along each second end 308b.

It will be understood that although the cross-sections A-A of FIGS. 6A-6C tend to show an eccentric housing 300 about the axis 305, the sections 310 actually define lobes that extend in a similar manner and distance from and about the axis 305. In other words, in the embodiments shown, one lobe 310 is shown in full cross-section while the other lobes 310 have radial centerlines 315 that do not align with the cross-section line A-A.

Referring to FIG. 6D, another embodiment of housing 300 is shown in cross-section B-B (shown in FIG. 5B). In this embodiment, each elongated section 310 includes one row 307 of equidistantly spaced openings 304. Each opening 304 includes a central or longitudinal axis 315 that intersects central axis 305 of housing 300. In this embodiment, each row 307 is longitudinally offset from each other. For instance, row 307a is longitudinally offset from row 307b, resulting in a longitudinal offset 615. As discussed earlier, openings 304 are placed in a pattern which depends upon the desired distribution of pipe dope within the pipe with larger and more numerous openings allowing more lubricant to flow through the housing and onto the corresponding pipe threads. In this embodiment, longitudinal offset 615 of rows 307 is configured to allow for the formation of a spiral pattern of pipe dope to be ejected through openings 304 as housing 300 is rotated during operation. In an embodiment, housing 300 has at least three rows 307 (e.g., 307a, 307b and 307c) of fifteen openings 304 per row 307. During lubrication, housing 300 is located in opening 50 by centrifugal applicator 130, surrounded by female pipe threads 52.

Referring to FIG. 7A, a top, cross-sectional view of the embodiment shown in FIG. 6A is shown. In this embodiment, as housing 300 is rotated and pipe dope is injected into opening 306, pipe dope is ejected through openings 304 along radial flowpaths 350 that are coincident to axes radially extending from central axis 305 toward concave inner surfaces 308. Flowpaths 350 flow from the center of housing 300 proximal to central axis 305 radially outward toward openings 304 and concave inner surfaces 308. As flowpaths 350 flow radially outward, flowpaths 350 contact or collide with inner surfaces 308 at an obtuse angle 325. The collision of pipe dope along radial flowpaths 350 with inner surfaces 308 at an obtuse angle 325 forcibly directs pipe dope toward openings 304. Specifically, such a collision results in a force vector on the pipe dope in the direction of openings 304, forcibly compelling lubricant disposed along inner surfaces 308 toward openings 304 as housing 300 rotates. Positioning of concave inner surfaces 308, resulting in angle 325, is configured to allow for the direction of cold (e.g., below 32° F.) and highly viscous lubricant flowing along flowpath 350 toward openings 304 and ejected therethrough. Consequently, sections 310 function as funnels to receive a volume of cold and viscous lubricant therein and then force the lubricant toward the exit openings 304. The continuous inner surfaces 308 ensure that all or substantially all of the lubricant contacts the inner surfaces 308 in a direction toward the openings 304 having a non-90° or obtuse angle.

Referring to FIG. 7B, an embodiment of a housing 700 that may be used in applicator 130 of lubrication assemblies 100 and 200 is shown in a top, cross-sectional view. Housing 700 includes similar features to housing 300, and thus, features shared between housings 700 and 300 have been labeled identically. In this embodiment, housing 700 includes four elongated or funnel sections 710 extending radially from central axis 305 of housing 700. Each elongated section 710 includes a plurality of openings 304. As discussed earlier with regard to housing 300, openings 304 are aligned in a row and are spaced equidistantly apart from each other along the longitudinal length of housing 700. Also, each pair of concave inner surfaces 708 of sections 710 are disposed in an opposed relationship at an angle 708a, where angle 708a is less than 180°. In the embodiment of housing 700, openings 304 each have a central or longitudinal axis 715 that radially extend from central axis 305 of housing 700. As housing 700 is rotated and lubricant is injected into opening 306 of housing 700, lubricant is ejected through openings 304 along radial flowpaths 350 that are coincident to axes radially extending from central axis 305 toward concave inner surface 708. As lubricant flows radially outward along flowpaths 350, lubricant contacts or collides with the concave inner surfaces 708 at an obtuse angle 725, forcibly compelling lubricant disposed against inner surfaces 708 in the direction of openings 304, thus expelling the lubricant through openings 304. The collision between lubricant along flowpath 350 and concave inner surfaces 708 at angle 725 results in a force vector on the lubricant in the direction of openings 304. Thus, positioning of concave inner surfaces 708, resulting in angle 725, is configured to allow for the expulsion of cold and highly viscous lubricant flowing along flowpaths 350 through openings 304. Consequently, sections 710 function as funnels to receive a volume of cold and viscous lubricant therein and then forcibly direct the lubricant towards the exit openings 304. Further, each section 710 functions as a lobe wherein the opposing concave surfaces 708 cause the lubricant to always strike the surfaces 708 at a non-90° or obtuse angle toward the openings 304.

Referring to FIG. 7C, an embodiment of a housing 800 that may be used in applicator 130 of lubrication assemblies 100 and 200 is shown in a top, cross-sectional view. Housing 800 includes similar features to housing 300, and thus, features shared between housings 800 and 300 have been labeled identically. In this embodiment, housing 800 includes five elongated or funnel sections 810 extending radially from central axis 305 of housing 800. Each elongated section 810 includes a plurality of openings 304. Openings 304 are aligned in a row and are spaced equidistantly apart from each other along the longitudinal length of housing 800. Also, each pair concave inner surfaces 808 of sections 810 are disposed in an opposed relationship at an angle 808a, where angle 808a is less than 180°. In the embodiment of housing 800, openings 304 each have a central or longitudinal axis 815 that radially extend from central axis 305 of housing 800. As housing 800 is rotated and lubricant is injected into opening 306 of housing 800, lubricant is ejected through openings 304 along radial flowpaths 350 that are coincident to axes radially extending from central axis 305 toward concave inner surface 808. As lubricant flows radially outward along flowpaths 350, lubricant contacts or collides with the concave inner surfaces 808 at an obtuse angle 825, causing a funneling action to forcibly compel or direct lubricant disposed against inner surfaces 808 in the direction of openings 304 and expelling the lubricant through openings 304. The collision between lubricant along flowpaths 350 and concave inner surfaces 808 at angle 825 results in a force vector on the lubricant in the direction of openings 304. Positioning of concave inner surfaces 808, resulting in angle 825, is configured to allow for the expulsion of cold and highly viscous lubricant flowing along flowpaths 350 through openings 304. Again, each section 810 functions as a lobe wherein the opposing concave surfaces 708 cause the lubricant to always strike the surfaces 708 at a non-90° or obtuse angle toward the openings 304.

While embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simply subsequent reference to such steps.

What is claimed is:

1. A pipe lubricant applicator comprising:
    a rotatable housing comprising an inlet opening to receive a lubricant, the housing having a central axis and a concave inner surface;
    wherein an axis extending radially from the central axis of the housing intersects the concave inner surface at an angle that is not 90° and that includes an obtuse angle;
    wherein the concave inner surface of the housing is configured to direct the lubricant in the direction of the obtuse angle towards an outlet opening of the housing.

2. The applicator of claim 1, further comprising a lubrication assembly coupled to the housing, the lubrication assembly to contain the lubricant.

3. The applicator of claim 2, wherein the lubrication assembly further comprises a motor connected to the housing and an actuation system coupled to a dosing device and the motor, the actuation system including a gas circuit, an electric circuit, and a hydraulic circuit in fluid communication with the hydraulic side of the dosing device.

4. The applicator of claim 1, wherein the housing comprises an elongate section having a pair of opposed concave inner surfaces.

5. The applicator of claim 4, wherein an angle that is less than 180° is formed between the pair of concave inner surfaces.

6. The applicator of claim 1, wherein substantially all of the axes extending radially from the central axis of the housing intersect the concave inner surface at angles that are not 90°.

7. The applicator of claim 1, wherein the lubricant is at a temperature below 32° F.

8. A pipe lubricant applicator comprising:
    an applicator housing to receive a pipe lubricant, the housing including a longitudinal axis, an inner surface, and an outer surface;
    an inlet opening in the housing through the inner and outer surfaces to receive the pipe lubricant, and an outlet opening for discharging the pipe lubricant;
    wherein the inner surface comprises a plurality of concave surfaces; and
    wherein a radial axis extending radially from the longitudinal axis intersects a tangent of a lateral cross-section of any one of the plurality of concave inner surfaces at an obtuse angle.

9. The applicator of claim 8 wherein the plurality of concave surfaces define a plurality of elongated sections each having a pair of opposed concave inner surfaces to funnel the pipe lubricant to the outlet opening.

10. The applicator of claim 8, wherein the inner surface of the housing is configured to direct the pipe lubricant towards the outlet opening.

11. The applicator of claim 9, wherein the pair of concave inner surfaces of an elongate section are disposed at an angle less than 180° relative to each other.

12. The applicator of claim 9, wherein a central axis of each elongate section intersects the longitudinal axis of the housing.

13. The applicator of claim 9, wherein substantially all of the axes extending radially from the central axis intersect one of the concave inner surfaces at an obtuse angle.

* * * * *